United States Patent [19]
Loy

[11] Patent Number: 4,636,044
[45] Date of Patent: Jan. 13, 1987

[54] OPTICAL SYSTEM FOR VIEWING A SCENE
[75] Inventor: Fernand R. Loy, Sceaux, France
[73] Assignee: U.S. Philips Corporation, New York, N.Y.
[21] Appl. No.: 605,534
[22] Filed: Apr. 30, 1984
[30] Foreign Application Priority Data
  May 11, 1983 [FR] France .................. 83 07911
[51] Int. Cl.⁴ .............................................. G02B 23/02
[52] U.S. Cl. .................................................... 350/539
[58] Field of Search ............. 350/538, 539, 340, 541, 350/543, 557, 558, 559, 567, 568
[56] References Cited
U.S. PATENT DOCUMENTS

| 3,173,012 | 3/1965 | DeWinter | 350/538 |
| 3,459,465 | 8/1969 | Rosin et al. | 350/543 |
| 4,158,504 | 1/1979 | de Ponteves et al. | 356/247 |
| 4,397,530 | 8/1985 | Baluteau | 350/559 |

FOREIGN PATENT DOCUMENTS
1444517 4/1976 United Kingdom .

Primary Examiner—John K. Corbin
Assistant Examiner—Vincent J. Lemmo
Attorney, Agent, or Firm—Marc D. Schechter

[57] ABSTRACT

An optical system comprises a number of optical elements arranged in a housing. The housing may be fixed to the underside of an airship. The system corrects for picture tilt. The housing comprises a first fixed portion, a second portion rotatable relative to the first portion around an axis XX', and a third portion rotatable relative to the second portion around an axis YY' orthogonal to XX'. The combination of the rotating motions of the portions B and C of the housing render it possible to rotate the line of sight of the optical system through more than one half-circle.

2 Claims, 8 Drawing Figures

OPTICAL SYSTEM FOR VIEWING A SCENE

BACKGROUND OF THE INVENTION

The invention relates to an optical system for viewing a scene. The optical system comprises optical elements arranged in a housing.

Such a system may be fixed under an airship and intended to provide the crew with an image of the landscape. The arrangement may be such that the image remains upright regardless of the direction of the line of sight. The system is particularly suitable for night vision using infrared radiation or intensification of visible radiation.

Image tilt may be corrected in a known manner (for example, see U.S. Pat. No. 4,158,504 corresponding to French Pat. No. 2,326,715).

SUMMARY OF THE INVENTION

It is an object of the invention to provide an optical system whose line of sight can be rotated through more than $2\pi$ steradians.

According to the invention, the housing has a first fixed portion. A second portion of the housing is capable of rotation relative to the first portion around a first axis. A third portion of the housing is capable of rotation relative to second portion around a second axis which is orthogonal with respect to the first axis. The rotatable portions of the housing enclose optical elements to form an image of a scene on a receiver. The combination of the rotating motions enables the line of sight of the optical system to be positioned in more than one half-circle.

DESCRIPTION OF THE PREFERRED EMBODIMENTS

Figure 1C:
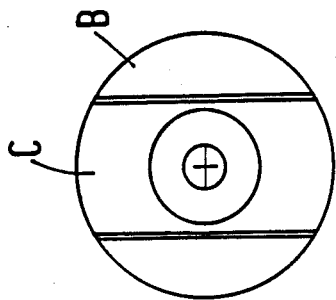
FIGS. 1a, 1b, and 1c schematically show three orthogonal projections of the system according to the invention.
Figure 1B:
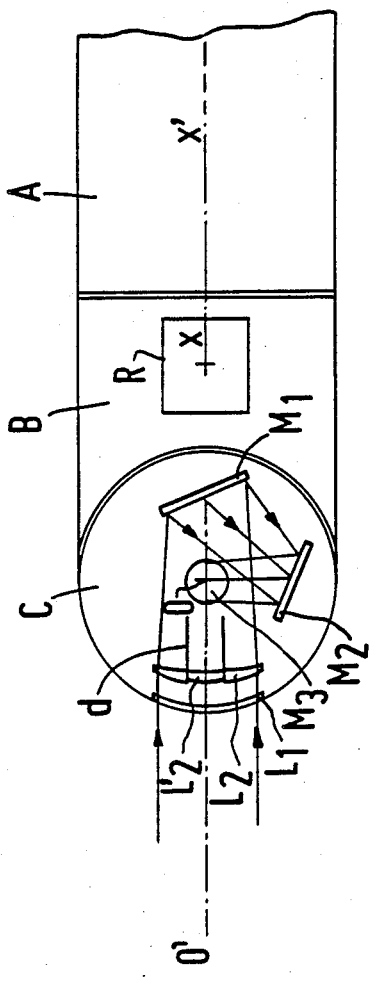
Figure 1A:
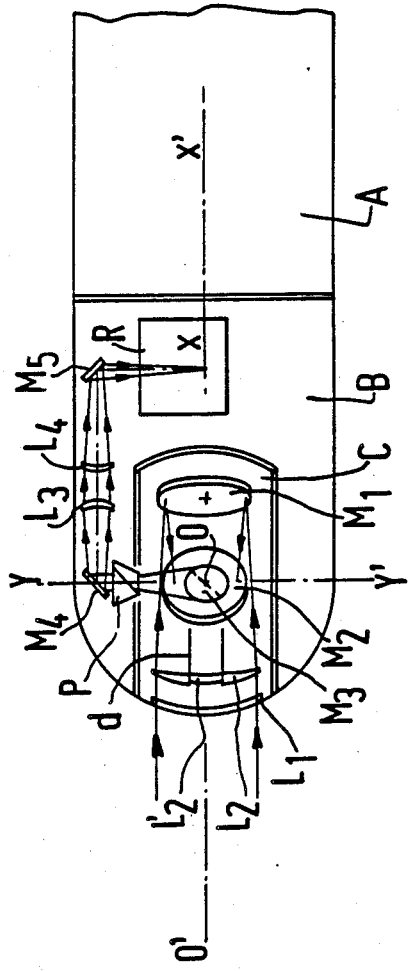

FIG. 1 shows schematically, in three orthogonal projections, the optical system according to the invention. The portion A of this housing may be fixed to an airship, not shown.

According to the invention, the portion B of the housing is rotatable relative to the portion A around the axis XX'. The portion C of the housing is rotatable relative to the portion B around the axis YY' which is orthogonal with respect to the axis XX'.

An array of optical elements is enclosed in the portions B and C of the housing. This array comprises, in the portion C, an aperture $L_1$, an objective $L_2$ having a long focal length (for the narrow field of view), and an objective $L'_2$ having a shorter focal length (for the wide field of view) arranged coaxial to $L_2$. The optical axis 00' of the objectives $L_2$ and $L'_2$ is the line of sight.

The optical axis of objective $L_2$ is folded by switching mirror $M_1$, and diverting mirrors $M_2$ and $M_3$ so as to form the image of the landscape in a plane situated at or near a Péchan prism P. Prism P is mounted rotatably around the axis YY' and is arranged in the portion B of the housing. The optical axis of objective $L'_2$ is likewise deflected by the mirror $M_3$ so as to form the image of the landscape in the same plane as the image formed by objective $L_2$.

After the Péchan prism P and in the portion B of the housing, image transport lenses $L_3$ and $L_4$ receive the image from $L_2$ or from $L'_2$ to form an image on the receiver R. The mirrors $M_4$ and $M_5$, which are arranged on both sides of $L_3$ and $L_4$, fold the beams.

Objective $L_2$ or $L'_2$ is selected by rotating switching mirror $M_3$ through 90° around the axis YY'. In practice $L'_2$ is located very close to $M_3$. It is easy to prevent the light from $L_2$ from affecting the image from $L'_2$ by providing a baffle d which separates $L_2$ and $L'_2$.

The motor drive of the portion B relative to the portion A is provided by a motor (not shown). The motor is an integral part of the portion A. The motor drive of the portion C relative to the portion B is provided by another motor (not shown) which is an integral part of the portion B. The motor drive of the mirror $M_3$ relative to the portion C is provided by a third motor (not shown) which is an integral part of the portion C. The motor drive of the prism P relative to the portion B is provided by a fourth motor (not shown) which is an integral part of the portion B.

The four motor drives are associated with gyroscopic pick-ups in order to, inter alia, fix the line of sight 00' in space.

The optical system operates as follows. When the portion C rotates around YY', the image from $L_2$ or $L'_2$ rotates relative to the portion B. This tilts the image on the receiver R. This tilt can be compensated by rotating prism P around YY'. The motor-driven prism P is mounted on a bearing which is fixed to the portion B. The motion of prism P is controlled by rotation around axes XX' and YY' in such manner that the image tilt is always corrected.

Figure 2A:
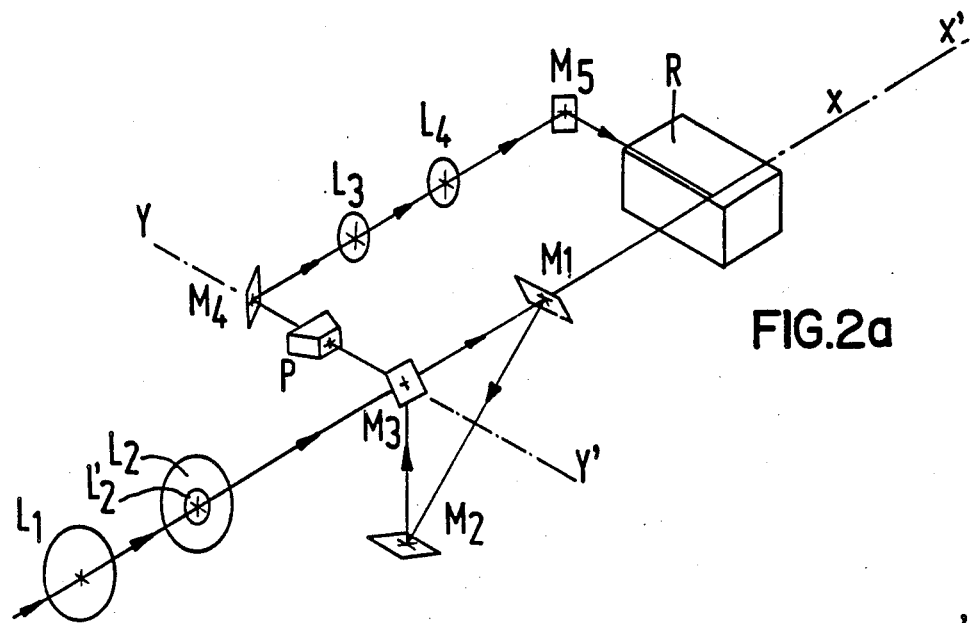
FIGS. 2a and 2b are perspective views of an array of optical elements in a narrow field of view arrangement and a wide field of view arrangement, respectively.
Figure 2B:
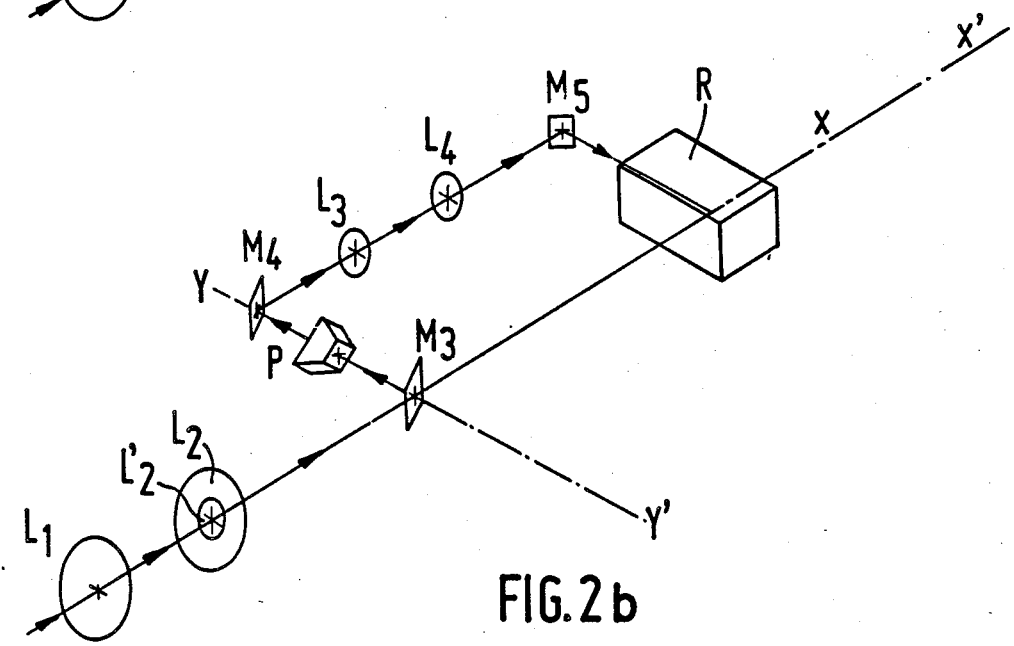

FIGS. 2a and 2b are schematical perspective views of the array of optical elements described above. FIG. 2a shows the arrangement for a narrow field of view, and FIG. 2b for a wide field of view. The optical elements have been given the same reference numerals as those shown in FIGS. 1a, 1b, and 1c. The two schematic diagrams clearly show the folding of the beam emerging from the concentric objective $L_2$ by the three mirrors when the long focal length objective is selected and of the beam emerging from the objective $L'_2$ by the single mirror $M_3$ when the short focal length objective is used. The image is thus formed in the same plane, no matter which objective is used. The fields are of the order of 2° to 3° for the narrow field of view, and from 6° to 9° for the wide field of view. The entrance pupil has a diameter on the order of 150 mm for the narrow field of view when the housing has an outside diameter of 320 mm.

Figure 3C:
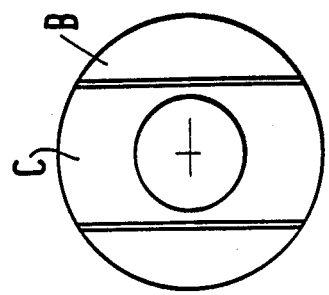
FIGS. 3a, 3b and 3c schematically show another embodiment of the system according to the invention.
Figure 3B:
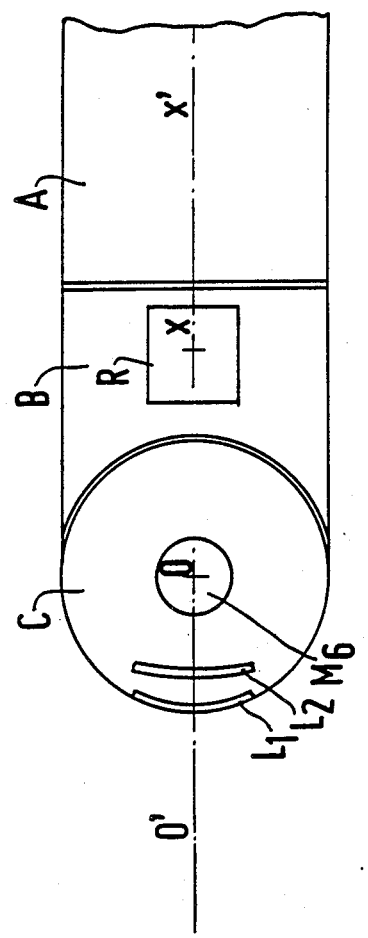
Figure 3A:
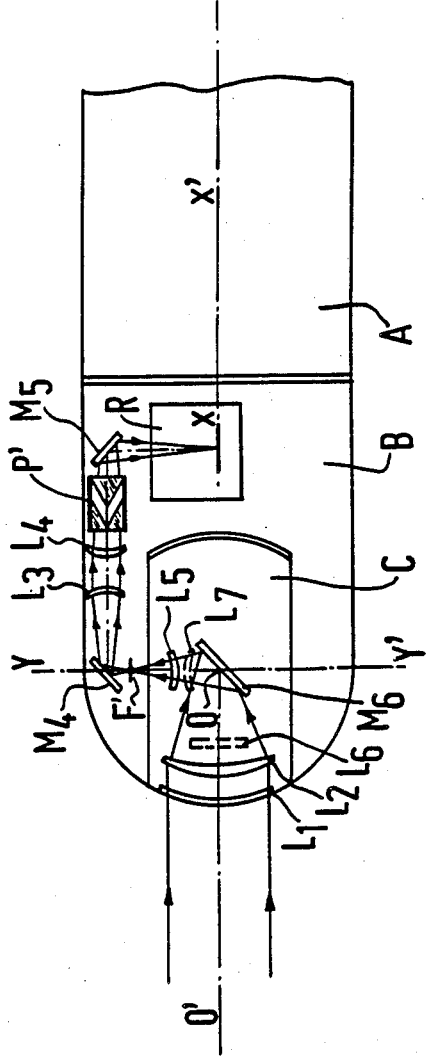

FIGS. 3a, 3b, and 3c show three orthogonal projections of an optical system which is a variation of the system shown in FIG. 1. Elements corresponding to those of FIG. 1 have been given the same reference numerals.

The array of optical elements comprises, in the portion C, an aperture $L_1$, and an objective having two focal lengths. The objective is formed from two orthogonal sets of lenses $L_2L_6$ and $L_5L_7$ in such manner that the beam incident on the first lens set along the direction XX' is deflected by the mirror $M_6$ toward the second lens set along the direction YY'. For the wide field of view, the four lenses $L_2$, $L_5$, $L_6$ and $L_7$ are used. For the narrow field of view, only the lenses $L_2$ and $L_5$ are used. The focal length is altered by inserting the two lenses $L_6$ and $L_7$, which must therefore be retractable (they are shown in FIGS. 3a, 3b and 3c by broken lines).

The image of the landscape formed in the focal plane F' is moved in the portion B of the housing by two image transport lenses $L_3$ and $L_4$. Lenses $L_3$ and $L_4$ are followed by a mobile Rautsch prism P', which rotates around the optical axis. Two mirrors $M_4$ and $M_5$, which are arranged on opposite sides of the lenses $L_2$ and $L_4$ and the prism P', successively deflect the beam onto the optical axis of the picture transport lenses and then onto the receiver R.

In this embodiment of the invention, the mirror $M_6$ is fixed relative to portion C of the housing. The mirrors $M_4$ and $M_5$ are fixed relative to portion B of the housing.

The mode of operation of the system shown in FIGS. 3a, 3b and 3c is similar to the mode of operation already described. The Räutsch prism corrects the picture tilt caused by rotation around the axes XX' and YY'. The Räutsch prism has the advantage that its optical length is shorter than that of other types of prisms suitable to compensate for tilting of the image.

The receiver R may either be a still or movie camera or a television camera with or without light intensification. Alternatively, receiver R may be a thermographic camera sensitive to infrared radiation.

For the case in which the system operates in the infrared in the atmospheric transmission band between 8 μm and 12 μm, the aperture $L_1$ is preferably made of zinc sulphide. In this case, the objectives $L_2$, $L'_2$, $L_5$, $L_6$ and $L_7$ are made of germanium. The Péchan prism P and the Räutsch prism P' are made of zinc selenide, and the lenses $L_3$ and $L_4$ are made of germanium.

What is claimed is:

1. An optical system for viewing a scene, said optical system comprising:
    a housing having first, second and third portions, the first portion being fixed relative to a first axis, the second portion being rotatable relative to the first portion around the first axis, said second portion having a second axis orthogonal to the first axis, the third portion being rotatable relative to the second portion around the second axis;
    inner and outer objective lenses arranged coaxially on a third axis in an aperture in the third portion of the housing, said third axis intersecting the second axis; and
    a switching mirror arranged at the intersection between the second and third axes, said switching mirror being rotatable relative to the third portion of the housing around the second axis;
    characterized in that;
    the inner objective passes light along the third axis directly onto the switching mirror; and
    the system further comprises a system of diverting mirrors for passing light from the outer objective onto the switching mirror along a fourth axis different from the third axis.

2. An optical system for viewing a scene, said optical system comprising:
    a housing having first, second and third portions, the first portion being fixed relative to a first axis, the second portion being rotatable relative to the first portion around the first axis, said second portion having a second axis orthogonal to the first axis, the third portion being rotatable relative to the second portion around the second axis; and
    optical elements arranged in the said rotating portions of the housing to form the image of the scene on a receiver in such a manner that the image tilt is always corrected;
    characterized in that said optical elements include:
    inner and outer objective lenses arranged coaxially on a third axis in an aperture of the said third portion of the housing, said third axis intersecting the second axis; and
    a switching mirror arranged at the intersection between the second and third axes, said switching mirror being rotatable relative to the third portion of the housing around the second axis; and
    characterized in that:
    said inner objective passes light along a path directly onto the switching mirror; and
    said optical elements further comprise a system of diverting mirrors for passing light from the outer objective onto the switching mirror along a longer path than the direct path.

* * * * *